United States Patent
Jung et al.

(10) Patent No.: US 10,505,371 B2
(45) Date of Patent: Dec. 10, 2019

(54) PHOTOVOLTAIC MODULE AND PHOTOVOLTAIC SYSTEM INCLUDING THE SAME

(71) Applicant: LG ELECTRONICS INC., Seoul (KR)

(72) Inventors: Hyunsuk Jung, Seoul (KR); Minseon Son, Seoul (KR); Kyoungsuk Ko, Seoul (KR); Dongwon Kim, Seoul (KR); Kaeun Lee, Seoul (KR); Yeongnam Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 15/671,817

(22) Filed: Aug. 8, 2017

(65) Prior Publication Data

US 2018/0041040 A1 Feb. 8, 2018

(30) Foreign Application Priority Data

Aug. 8, 2016 (KR) .......................... 10-2016-0100790

(51) Int. Cl.
  *H02J 3/38* (2006.01)
  *H02S 40/32* (2014.01)
  (Continued)

(52) U.S. Cl.
  CPC .............. *H02J 3/383* (2013.01); *H02J 3/385* (2013.01); *H02J 13/002* (2013.01); *H02S 40/32* (2014.12);
  (Continued)

(58) Field of Classification Search
  CPC ..... H02J 3/38; H02J 3/383; H02J 3/00; H02S 40/32; H02S 40/34; H02S 40/00;
  (Continued)

(56) References Cited

U.S. PATENT DOCUMENTS

2006/0076048 A1* 4/2006 Gaudiana ............. H01G 9/2031
  136/246
2007/0012349 A1* 1/2007 Gaudiana ............... G06Q 30/00
  136/244

(Continued)

*Primary Examiner* — Fritz M Fleming
*Assistant Examiner* — Jagdeep S Dhillon
(74) *Attorney, Agent, or Firm* — Birch, Stewart, Kolasch & Birch, LLP

(57) ABSTRACT

Discussed is a photovoltaic system including a plurality of photovoltaic modules outputting AC power, a plurality of communication devices to receive respective reference signals from the plurality of photovoltaic modules and to output reference signal information corresponding to the reference signals, a gateway to receive the reference signal information and to allocate network information to each of the plurality of photovoltaic modules and to match ID information received from the plurality of photovoltaic modules with the network information, and a server to calculate position information on the plurality of photovoltaic modules based on the reference signal information from the gateway and to perform array building corresponding to arrangement of the plurality of photovoltaic modules based on the position information, the ID information, and the network information.

13 Claims, 20 Drawing Sheets

(51) Int. Cl.
  *H02J 13/00* (2006.01)
  *H02S 50/00* (2014.01)
  *H02S 50/15* (2014.01)

(52) U.S. Cl.
  CPC .............. *H02S 50/00* (2013.01); *H02S 50/15* (2014.12); *Y02B 10/14* (2013.01); *Y02B 90/2615* (2013.01); *Y02E 10/58* (2013.01); *Y02E 40/72* (2013.01); *Y04S 10/123* (2013.01); *Y04S 40/121* (2013.01)

(58) Field of Classification Search
  CPC ....... H02S 50/00; H02S 50/10; G01R 21/133; G01R 21/00; G01R 31/26; H01L 31/052; H01L 31/054; G06F 17/50
  USPC ........ 307/82, 80, 66, 64, 149; 700/287, 285; 702/182, 189; 703/1, 13–18; 136/246, 136/244, 248, 245
  See application file for complete search history.

(56) References Cited

U.S. PATENT DOCUMENTS

| | | | |
|---|---|---|---|
| 2009/0050192 A1* | 2/2009 | Tanaka | H02S 20/00 136/246 |
| 2010/0224227 A1* | 9/2010 | Lindsey | H02S 50/10 136/244 |
| 2011/0308574 A1* | 12/2011 | Vaidyanathan | H01L 31/0504 136/246 |
| 2012/0310427 A1* | 12/2012 | Williams | G05F 1/67 700/287 |
| 2012/0316802 A1* | 12/2012 | Presher, Jr. | H02J 7/35 702/58 |
| 2013/0342018 A1* | 12/2013 | Moon | H02J 3/40 307/80 |
| 2013/0346054 A1* | 12/2013 | Mumtaz | H02J 3/383 703/13 |
| 2014/0025343 A1* | 1/2014 | Gregg | G06F 17/5004 703/1 |
| 2014/0049886 A1* | 2/2014 | Lee | H02J 4/00 361/679.01 |
| 2014/0149076 A1* | 5/2014 | Jarnason | H02S 50/10 702/182 |
| 2014/0267391 A1* | 9/2014 | Cummings | G06T 11/206 345/629 |
| 2016/0104138 A1* | 4/2016 | Newell | G06Q 20/145 705/34 |
| 2016/0125557 A1* | 5/2016 | Rosner | H01L 31/02021 705/7.23 |
| 2016/0238642 A1* | 8/2016 | Akselrod | G01R 21/133 |
| 2018/0196896 A1* | 7/2018 | Arai | G06Q 10/00 |

\* cited by examiner

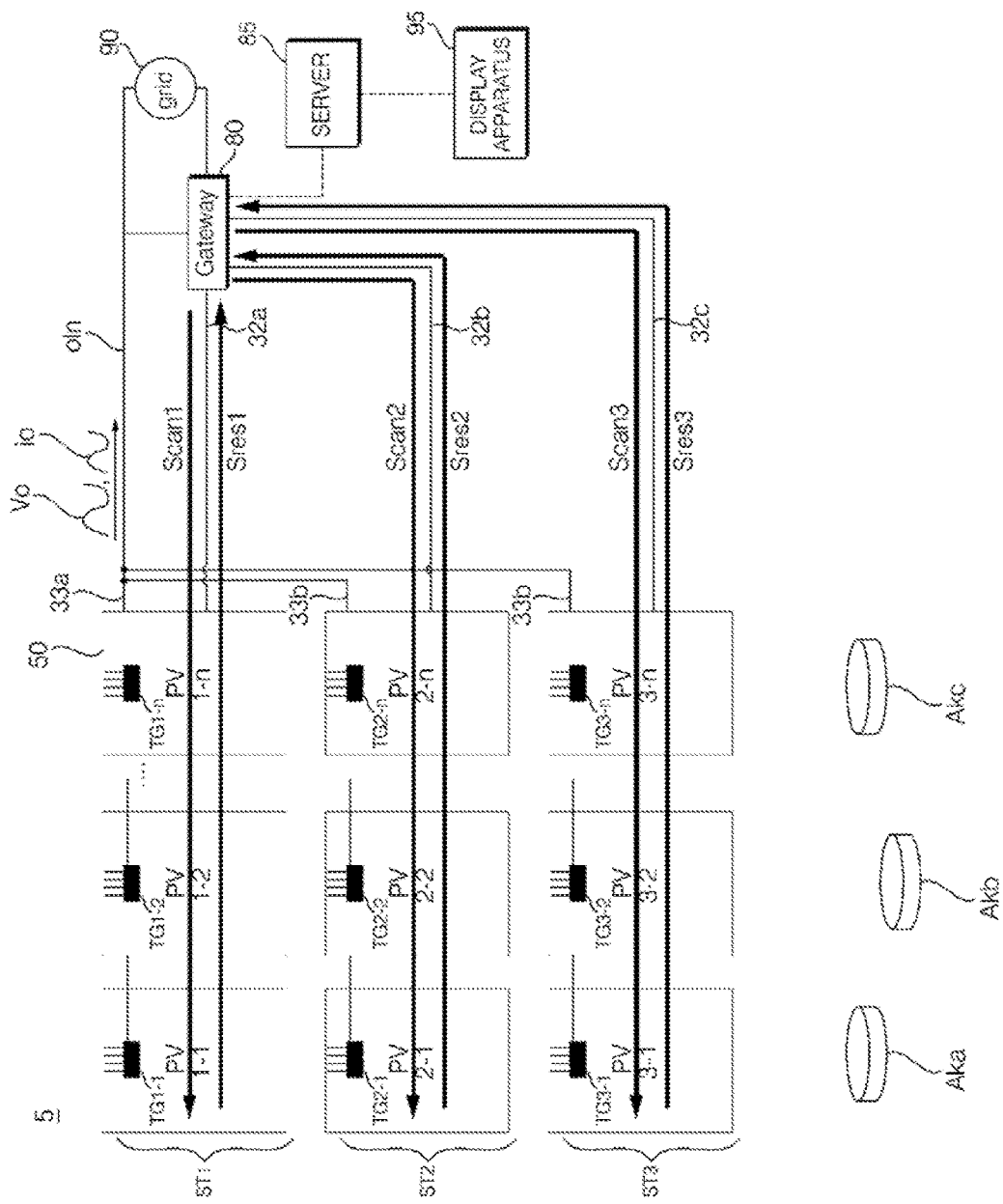

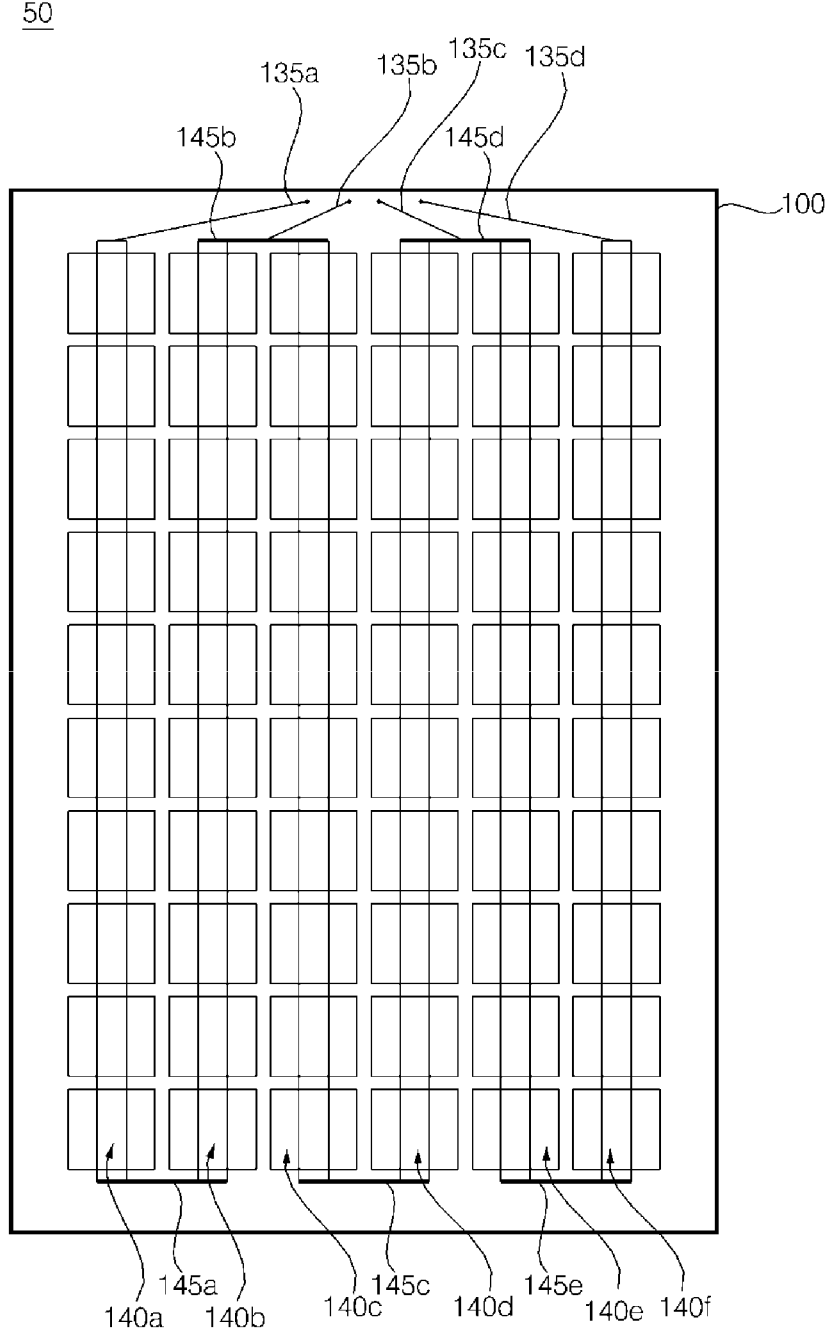

PHOTOVOLTAIC MODULE AND PHOTOVOLTAIC SYSTEM INCLUDING THE SAME

CROSS-REFERENCE TO RELATED APPLICATION

This application claims the priority benefit of Korean Patent Application No. 10-2016-0100790, filed on Aug. 8, 2016 in the Korean Intellectual Property Office, the disclosure of which is incorporated herein by reference in its entirety.

BACKGROUND OF THE INVENTION

1. Field of the Invention

Embodiments of the present invention relate to a photovoltaic module and a photovoltaic system including the same, and more particularly, to a photovoltaic module capable of easily calculating position information thereof and easily building an array corresponding to arrangement of a plurality of photovoltaic modules based on the calculated position information, and a photovoltaic system including the same.

2. Description of the Related Art

Recently, as existing energy resources such as oil and coal are being depleted, interest in alternative energy is increasing. Among such alternative energy technologies, solar cells, which convert solar energy directly into electric energy using semiconductor devices, are attracting attention.

The photovoltaic module refers to connection of solar cells for solar power generation in series or in parallel.

Meanwhile, in order to construct a photovoltaic system, a plurality of photovoltaic modules may be arranged in an array, and an installer must perform array building after installing the plurality of photovoltaic modules. In array building, information about the photovoltaic modules needs to be manually input, which is inconvenient. Various methods for simplifying this operation have been researched.

SUMMARY OF THE INVENTION

Therefore, the embodiments of the present invention have been made in view of the above problems, and it is an object of the present invention to provide a photovoltaic module capable of easily calculating a position information on the photovoltaic module and easily performing array building corresponding to an arrangement of a plurality of photovoltaic modules based on the calculated position information.

In accordance with an aspect of the present invention, the above and other objects can be accomplished by the provision of a photovoltaic system including a plurality of photovoltaic modules to output alternating current (AC) power, a plurality of communication devices to receive respective reference signals from the plurality of photovoltaic modules and to output reference signal information corresponding to the reference signals, a gateway to receive the reference signal information, to allocate network information to each of the plurality of photovoltaic modules and to match identification (ID) information received from the plurality of photovoltaic modules with the network information, and a server to calculate position information on the plurality of photovoltaic modules based on the reference signal information from the gateway and to perform array building corresponding to an arrangement of the plurality of photovoltaic modules based on the position information, the ID information, and the network information.

In accordance with another aspect of the present invention, there is provided a photovoltaic module including a solar cell module having a plurality of solar cells, an inverter to convert a direct current (DC) power from the solar cell module to alternating current (AC) power, a communication unit to transmit identification (ID) information to a gateway, and a signal generator to generate and output a reference signal containing the ID information.

BRIEF DESCRIPTION OF THE DRAWINGS

The above and other objects, features and other advantages of the present invention will be more clearly understood from the following detailed description taken in conjunction with the accompanying drawings, in which:

FIGS. 6A to 6E are reference diagrams for explaining the operation method of FIG. 5;

FIG. 11 is a front view showing the photovoltaic module of FIG. 3;

DETAILED DESCRIPTION OF THE EMBODIMENTS

Reference will now be made in detail to the example embodiments of the present invention, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
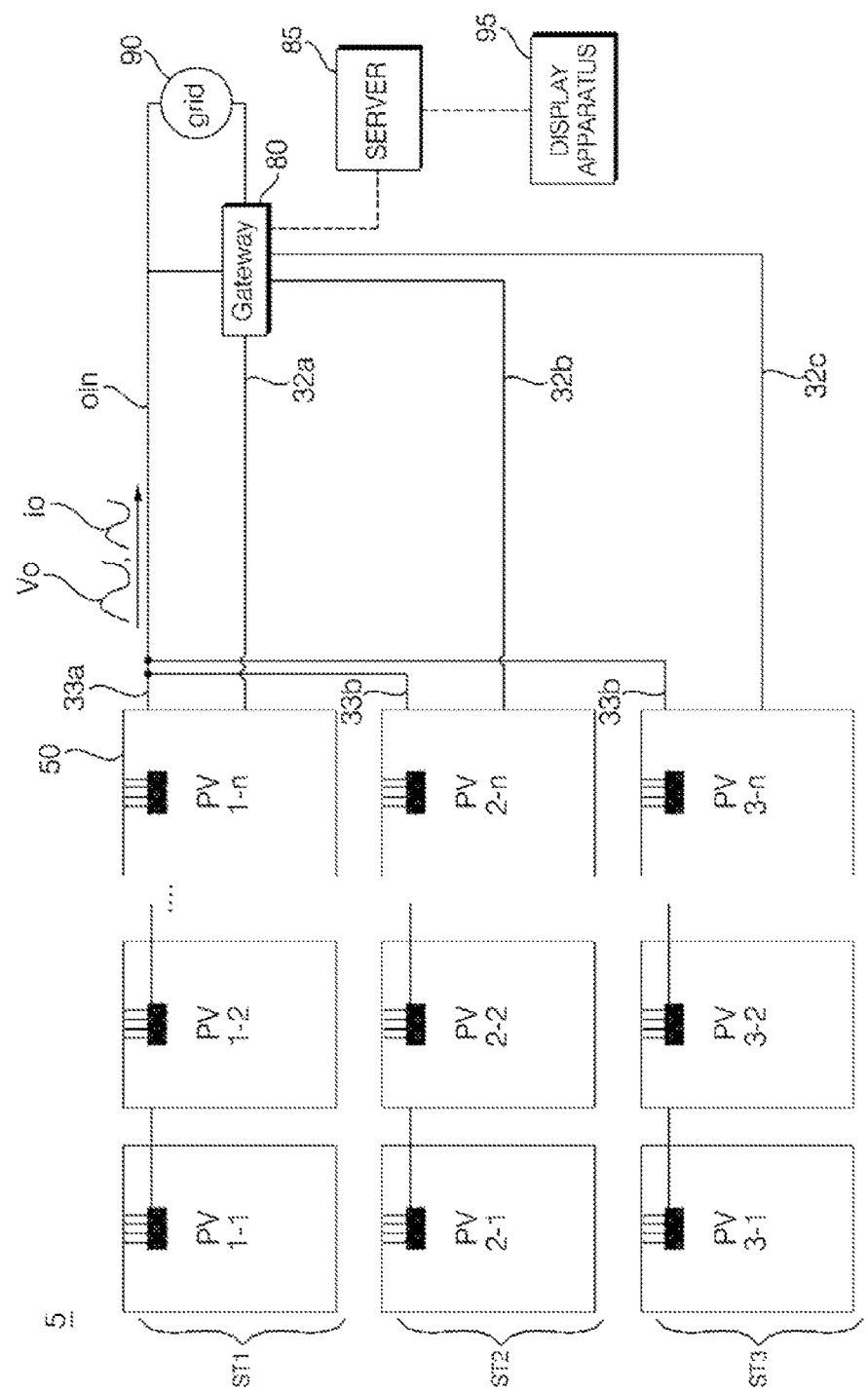
FIG. 1 shows a conventional photovoltaic system.
Figure 2:
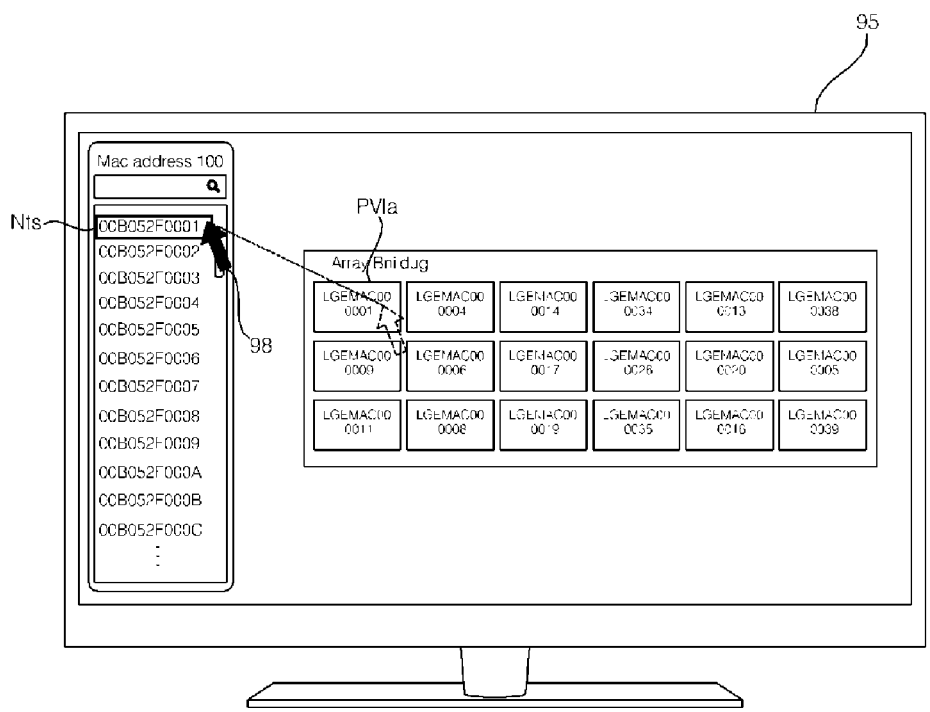
FIG. 2 illustrates array building in the photovoltaic system of FIG. 1.

FIG. 1 shows a conventional photovoltaic system, and FIG. 2 illustrates array building in the photovoltaic system of FIG. 1.

Referring to FIGS. 1 and 2, a conventional photovoltaic system 5 may include a plurality of photovoltaic modules PV1-1 to PV3-*n* for outputting AC power, a gateway 80, a grid 90 supplied with the AC power from the plurality of photovoltaic modules PV1-1 to PV3-*n*, a server 85, and a display apparatus 95.

Once the installer installs the plurality of photovoltaic modules PV1-1 to PV3-*n* on the roof of a building or the like and then installs the gateway 80, the gateway 80 may allocate network information corresponding to the plurality of photovoltaic modules PV1-1 to PV3-*n*.

The gateway 80 may receive ID information on the plurality of photovoltaic modules PV1-1 to PV3-*n* from the plurality of photovoltaic modules PV1-1 to PV3-*n*.

The server 85 may receive the network information corresponding to the plurality of photovoltaic modules PV1-1 to PV3-*n* and the ID information on the plurality of photovoltaic modules PV1-1 to PV3-*n*.

Here, the ID information on the plurality of photovoltaic modules PV1-1 to PV3-*n*, the network information, and the position information are not matched with each other yet. Accordingly, by manual input of the installer, the ID information or position information needs to be matched with the network information.

FIG. 2 illustrates that a list including a plurality of pieces of network information is displayed in an area of the display apparatus 95 and an array building image including the ID information on the plurality of photovoltaic modules PV1-1 to PV3-*n* and corresponding icons is displayed in another area of the display apparatus 95.

According to FIG. 2, since the ID information on the plurality of photovoltaic modules PV1-1 to PV3-*n* and the network information are not matched with each other yet, the installer may match the network information with the icons in the array building image by dragging and dropping first network information Nts in the list of network information onto a first icon PVla in the array building image using a pointer 98. That is, each piece of network information may be matched with the ID information.

However, in manually performing array building, the installer recognizes and compares the network information and the ID information based on stickers which have network information written thereon and are attached to a separate paper drawing. Accordingly, this method has a problem such as incorrect input or omission.

In particular, as the number of the plurality of photovoltaic modules PV1-1 to PV3-*n* increases, error probability increases and the time needed for the matching operation also increases considerably.

Accordingly, the present invention proposes a method of automatically building an array for a plurality of photovoltaic modules.

Figure 3:
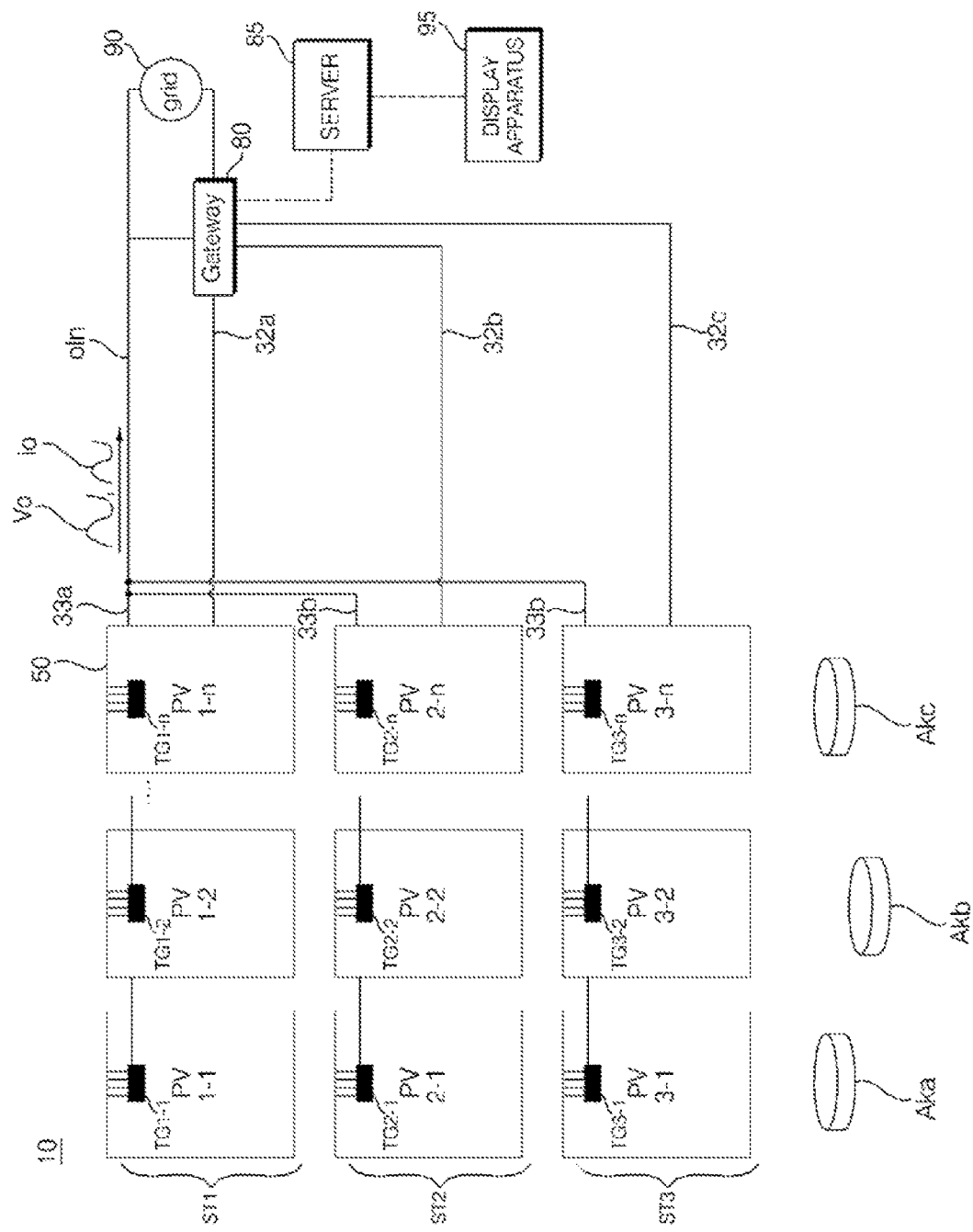
FIG. 3 is a diagram illustrating a photovoltaic system according to an embodiment of the present invention.

FIG. 3 is a diagram illustrating a photovoltaic system according to an embodiment of the present invention.

Referring to FIG. 3, a photovoltaic system 10 according to an embodiment of the present invention may include a plurality of photovoltaic modules PV1-1 to PV3-*n* for outputting AC power, a plurality of communication devices AKa to AKc for receiving respective reference signals Sref from the plurality of photovoltaic modules PV1-1 to PV3-*n* and outputting reference signal information Sref1 to Sref3 corresponding to the reference signals Sref, a gateway 80 for receiving the reference signal information Sref1 to Sref3, allocating network information to each of the plurality of photovoltaic modules PV1-1 to PV3-*n* and matching ID information received from the plurality of photovoltaic modules PV1-1 to PV3-*n* with the network information, and a server 85 for calculating position information on the plurality of photovoltaic modules PV1-1 to PV3-*n* based on the reference signal information Sref1 to Sref3 from the gateway 80 and performing array building corresponding to arrangement of the plurality of photovoltaic modules PV1-1 to PV3-*n* based on the position information, the ID information, and the network information. Thereby, the position information on the photovoltaic module 50 may be easily calculated and further array building corresponding to arrangement of the plurality of photovoltaic modules PV1-1 to PV3-*n* may be easily performed based on the calculated position information.

Particularly, by automatically performing array building corresponding to the arrangement of the plurality of photovoltaic modules PV1-1 to PV3-*n*, user convenience may be increased.

The photovoltaic system 10 may further include a display apparatus 95. By displaying an array building image corresponding to the array building through the display apparatus 95, the user is allowed to easily check the array building.

The server 85 calculates, based on the power information of each of the plurality of photovoltaic modules PV1-1 to PV3-*n*, power information that is being output from all of the photovoltaic modules PV1-1 to PV3-*n*, and thus the array building image and the power information may be displayed together with the display apparatus 95. Thereby, user convenience may be enhanced.

Each of the photovoltaic modules PV1-1 to PV3-*n* may include a solar cell module 100 having a plurality of solar cells, an inverter unit 540 for outputting AC power converted based on DC power from the solar cell module, a communication unit 580 for transmitting the ID information, and a signal generator TG for generating and wirelessly outputting a reference signal Sref containing the ID information.

Here, the inverter unit 540, the communication unit 580, and the signal generator TG may be provided in a junction box 200 attached to the back surface of the solar cell module 100.

In the drawing, the plurality of photovoltaic modules PV1-1 to PV3-*n* is illustrated as being arranged in an array of 3*n, and the first to third photovoltaic module strings ST1 to ST3 may output AC power to the grid 90 through cables 33*a* to 33*c*, respectively.

The first to third photovoltaic module strings ST1 to ST3 may perform power line communication (PLC) through the cables 32*a* to 32*c* output from the communication unit 580 in each junction box 200, thereby transmitting voltage information, current information, power generation amount information, and the like to the gateway 80.

The first to third photovoltaic module strings ST1 to ST3 may transmit ID information on the respective photovoltaic modules PV1-1 to PV3-*n* by the cables 32*a* to 32*c* output from the communication unit 580 in each junction box 200.

The signal generator TG is used to acquire position information of each of the photovoltaic modules PV1-1 to PV3-*n* together with a plurality of external communication devices AKa to AKc.

Particularly, a plurality of communication devices AKa to AKc may receive the reference signal Sref output from each signal generator TG of the plurality of photovoltaic modules PV1-1 to PV3-*n*, and output reference signal information Sref1 to Sref3 corresponding to the reference signals Sref. In particular, the plurality of communication devices may output the reference level information to the gateway 80.

The gateway 80 may transmit the reference signal information Sref1 to Sref3, the ID information, and the network information to the server 85.

The server 85 may receive the reference signal information Sref1 to Sref3 from the gateway 80 and calculate the position information on the plurality of photovoltaic modules PV1-1 to PV3-*n* based on differences in the reference signal information Sref1 to Sref3 among the communication devices AKa to AKc.

In particular, the server 85 may calculate the position information on the plurality of photovoltaic modules PV1-1 to PV3-*n* based on the signal level difference or phase difference of the reference signal information Sref1 to Sref3 for each of the communication devices AKa to AKc, using the triangulation technique.

Meanwhile, the signal generator TG may output a UWB (Ultra Wide Band) communication-based beacon signal as a reference signal.

The network information may be media access control (MAC) address information.

The gateway 80 may detect AC current io and AC voltage vo flowing through the cable oln and output from the photovoltaic module 50.

Figure 4A:
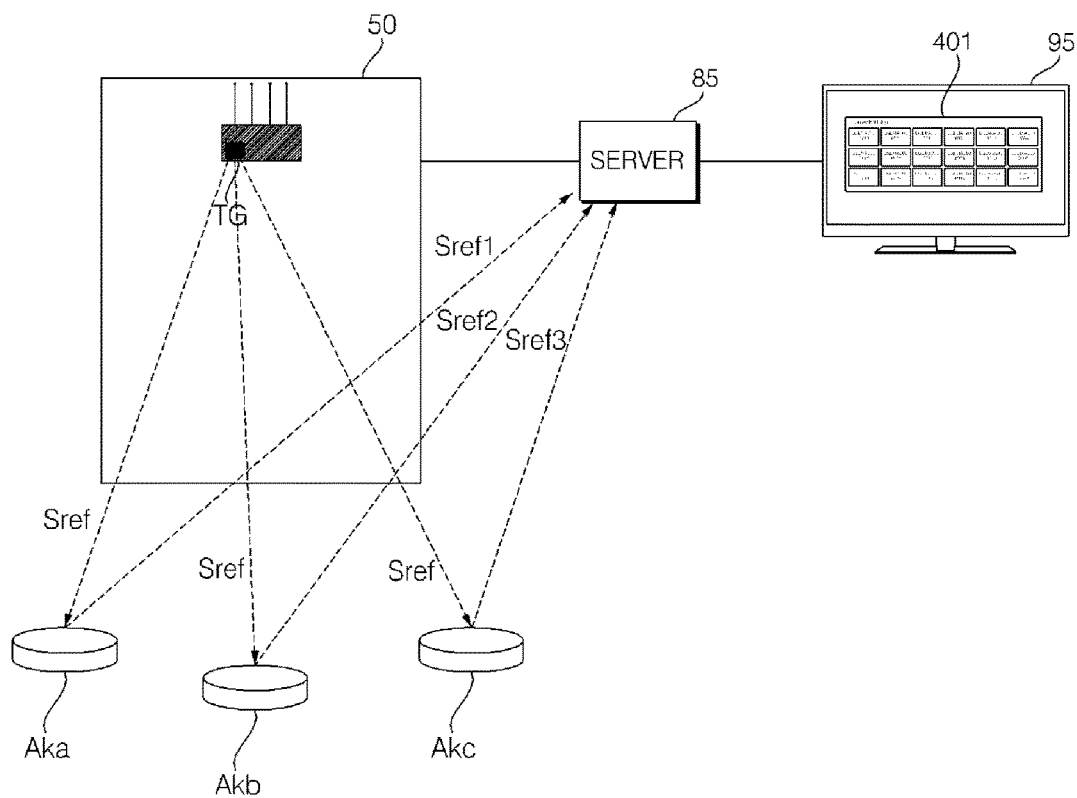
FIGS. 4A and 4B are diagrams illustrating signal flow between the photovoltaic module and the plurality of communication devices in FIG. 3.
Figure 4B:
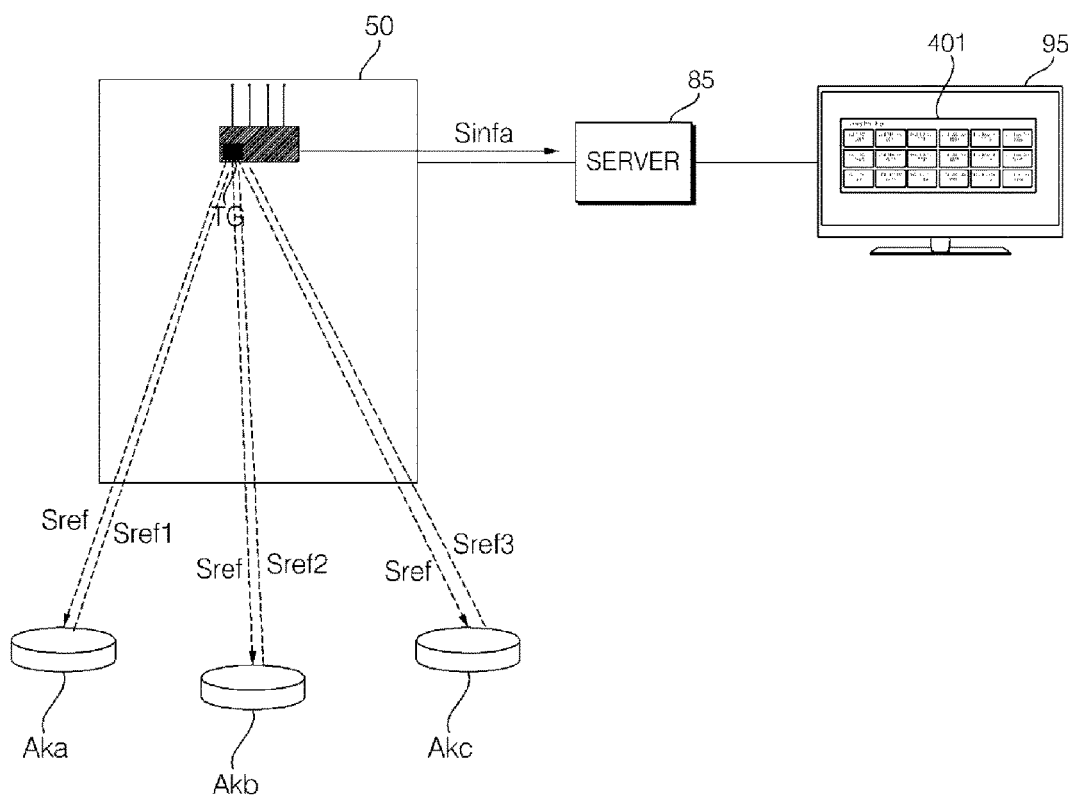

FIGS. 4A and 4B are diagrams illustrating signal flow between the photovoltaic module and the plurality of communication devices in FIG. 3.

Referring to FIG. 4A, the signal generator TG in the photovoltaic module 50 may generate and wirelessly output the reference signal Sref.

For example, the reference signal Sref may contain the ID information on the photovoltaic module 50. The reference signal Sref may further include network information (for example, MAC address information) on the photovoltaic module 50 in addition to the ID information.

The reference signal Sref may be a UWB-based or Zig-Bee-based beacon signal.

Next, the plurality of communication devices AKa to AKc may receive the reference signal Sref from the photovoltaic module 50 and extract the ID information and the like from the received reference signal Sref, and may further extract the network information (for example, MAC address information).

The plurality of communication devices AKa to AKc may output the reference signal information Sref1 to Sref3 corresponding to the reference signal Sref to the gateway 80 or the server 85 based on the extracted ID information, the extracted network information, and the like.

Here, the reference signal information Sref1 to Sref3 may include signal level information, phase information, or reception time information on the received reference signal Sref.

Meanwhile, the server 85 may calculate the position information on the plurality of photovoltaic modules PV1-1 to PV3-*n* based on the signal level difference or phase difference of the reference signal information Sref1 to Sref3 for each of the communication devices AKa to AKc, using the triangulation technique.

The server 85 may configure array building of the photovoltaic modules based on the calculated position information on the plurality of photovoltaic modules PV1-1 to PV3-*n*, and create an array building image corresponding to the array building.

The display apparatus 95 may display an array building image 4010 of the photovoltaic modules generated by the server 85. Thereby, the user or the installer may easily check the array building.

Next, FIG. 4B is a view similar to FIG. 4A except that the plurality of communication devices AKa to AKc transmits the reference signal information Sref1 to Sref3 to the photovoltaic module 50 rather than to the gateway 80 or the server 85.

Thus, the signal generator TG or the communication unit 580 in the photovoltaic module 50 may receive the reference signal information Sref1 to Sref3 output from the plurality of communication devices AKa to AKc.

In this instance, since the reference signal information Sref1 to Sref3 is a received signal corresponding to the reference signal Sref and thus may be called a response signal.

That is, the signal generator TG in the photovoltaic module 50 may wirelessly output the reference signal Sref1 to Sref3 and receive response signals Sref1 to Sref3 corresponding thereto from the plurality of communication devices Aka to AKc.

The communication unit 580 in the photovoltaic module may transmit the received reference signal information Sref1 to Sref3 to the gateway 80 or the server 85. In this operation, the information may be transmitted by wire through PLC.

Meanwhile, the server 85 may calculate the position information on the plurality of photovoltaic modules PV1-1 to PV3-*n* based on the signal level difference or phase difference of the reference signal information Sref1 to Sref3 for each of the communication devices AKa to AKc, using the triangulation technique.

The server 85 may constitute an array building of the photovoltaic modules based on the calculated position information on the plurality of photovoltaic modules PV1-1 to PV3-*n*, and create an array building image corresponding to the array building.

The display apparatus 95 may display an array building image 4010 of the photovoltaic modules generated by the server 85. Thereby, the user or the installer may easily check the array building.

Figure 5:
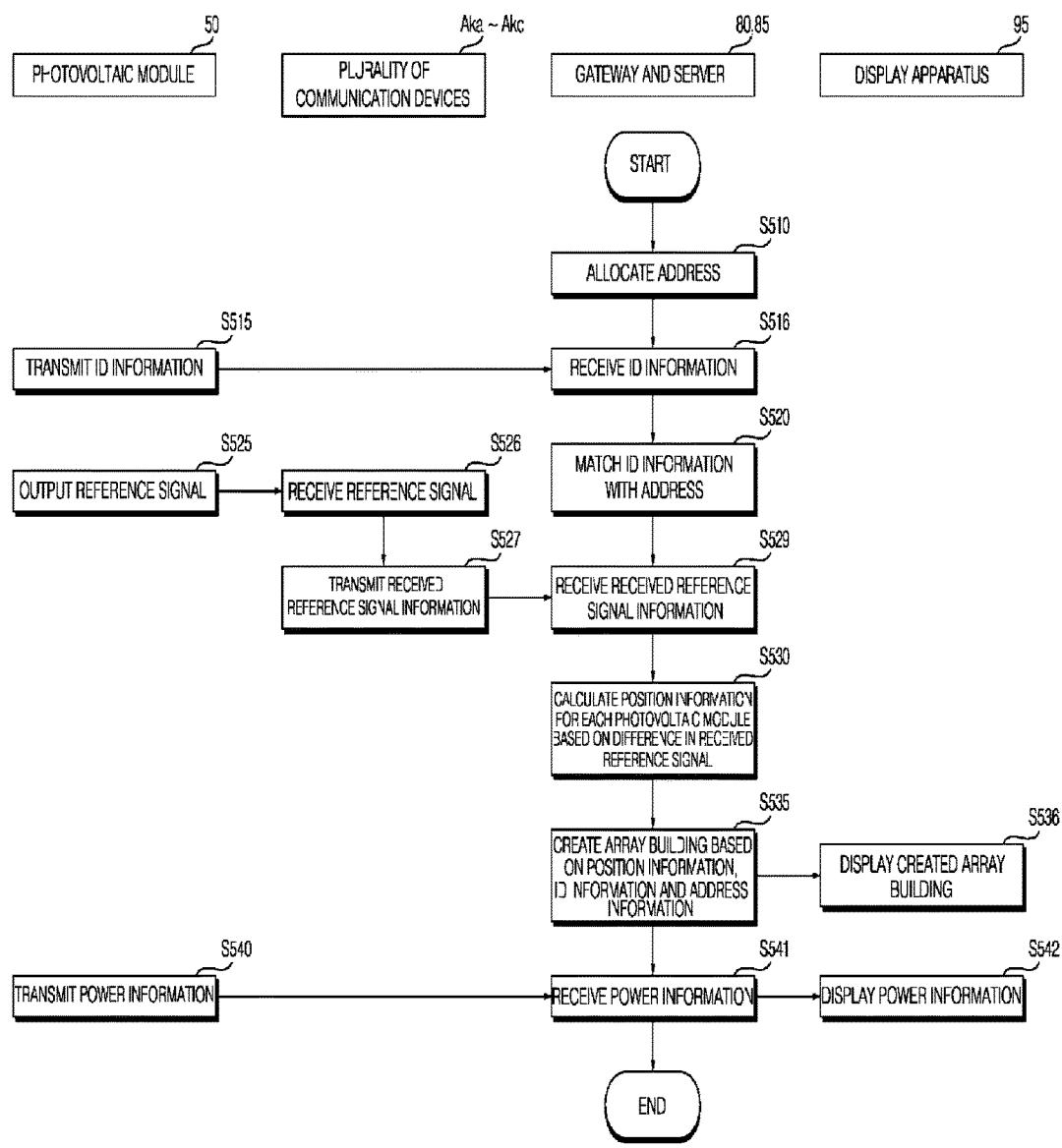
FIG. 5 is a flowchart illustrating an operation method of a photovoltaic system according to an embodiment of the present invention.

FIG. 5 is a flowchart illustrating an operation method of a photovoltaic system according to an embodiment of the present invention, and FIGS. 6A to 6E are reference diagrams for explaining the operation method of FIG. 5.

Referring to FIG. 5, when installation of the gateway 80 is completed by the installer, the gateway 80 may allocate network information corresponding to the plurality of photovoltaic modules PV1-1 to PV3-*n* (S510).

Here, the network information may be media access control (MAC) address information.

For example, the gateway 80 may randomly allocate network information corresponding to the plurality of photovoltaic modules PV1-1 to PV3-*n*.

After allocating the network information, the gateway 80 may transmit a scan signal to the plurality of photovoltaic modules PV1-1 to PV3-*n* based on the allocated network information.

FIG. 6A illustrates scanning of a plurality of photovoltaic modules PV1-1 to PV3-*n*.

As shown in FIG. 6A, when the plurality of photovoltaic modules PV1-1 to PV3-*n* in the array of 3*n is installed, the gateway 80 may be connected to a first cable 32a corresponding to a first string ST1, a second cable 32b corresponding to a second string ST2, and a third cable 32c corresponding to a third string ST3.

Data exchange by PLC may be performed between the plurality of photovoltaic modules PV1-1 to PV3-*n* and the gateway 80 through the first to third cables 32a to 32c.

The gateway 80 may output a first scan signal Scan1 to the first cable 32a at a first point in time.

Accordingly, the plurality of photovoltaic modules PV1-1 to PV1-$n$ belonging to the first string ST1 may transmit the first scan signal Scan1 input thereto to an adjacent photovoltaic module.

Meanwhile, the photovoltaic module 50 may output ID information in response to reception of the scan signal (S515).

Specifically, upon receiving the first scan signal Scan1, the plurality of photovoltaic modules PV1-1 to PV1-$n$ may output, to the gateway 80, a first response signal Sres1 containing the ID information (e.g., product number, serial number, and the like) on the photovoltaic module and the network information (MAC address information) in response to the first scan signal Scan1.

A plurality of packets including the network information on each photovoltaic module may be included in the first response signal Sres1 and the first response signal Sres1 may be received by the gateway 80 at a predetermined time.

Alternatively, the first response signal Sres1 may refer a plurality of signals containing the network information on each photovoltaic module. Accordingly, the first response signal Sres1 including a plurality of signals may be received by the gateway 80 within a predetermined period.

Similarly to the first string ST1, second and third scan signals Scan2 and Scan3 may be transmitted to the second string ST2 and the third string ST3, respectively, and second and third response signals Sres2 and Scres may be received from the second string ST2 and the third string ST3.

The gateway 80 may receive the ID information contained in the first to third response signals Sres1 to Sres3 (S516).

Next, the gateway 80 may match the network information (MAC address information) on the plurality of photovoltaic modules PV1-1 to PV1-$n$ with the ID information based on the first to third scan signals Scan1 to Scan3 and the first to third response signals Sres1 to Sres3 (S520).

Figure 6B:
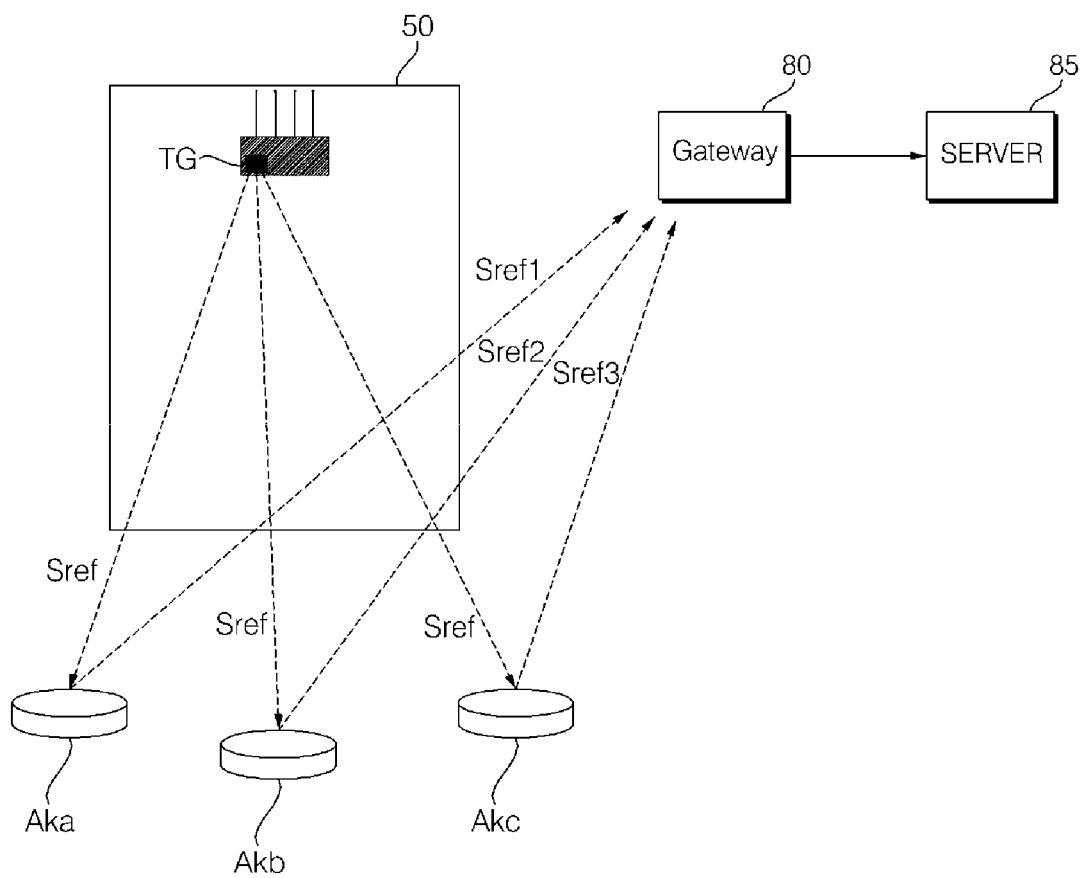

Meanwhile, the signal generator TG in the photovoltaic module 50 may wirelessly output the reference signal Sref as shown in FIG. 6B (S525).

For example, the reference signal Sref may contain the ID information on the photovoltaic module 50. The reference signal Sref may further include network information (for example, MAC address information) on the photovoltaic module 50 in addition to the ID information.

The reference signal Sref may be a UWB-based or Zig-Bee-based beacon signal.

Next, the plurality of communication devices AKa to AKc may receive the reference signal Sref from the photovoltaic module 50 (S526).

The plurality of communication devices AKa to AKc may extract the ID information and the like from the received reference signal Sref, and may further extract the network information (for example, MAC address information).

Next, as shown in FIG. 6B, the plurality of communication devices AKa to AKc may output the reference signal information Sref1 to Sref3 corresponding to the reference signal Sref to the gateway 80 or the server 85 based on the extracted ID information, the extracted network information, and the like (S527).

Here, the reference signal information Sref1 to Sref3 may include signal level information, phase information, or reception time information on the received reference signal Sref.

The gateway 80 may receive the reference signal information Sref1 to Sref3 (S529), and transmit the same to the server 85.

The server 85 may calculate the position information on each photovoltaic module based on differences in the received reference signal information Sref1 to Sref3 (S530).

For example, the server 85 may calculate the position information on the plurality of photovoltaic modules PV1-1 to PV3-$n$ based on the signal level difference or phase difference of the reference signal information Sref1 to Sref3 for each of the communication devices AKa to AKc, using the triangulation technique.

The server 85 may configure array building based on the position information, ID information, and network information (MAC address information) on the plurality of photovoltaic modules PV1-1 to PV3-$n$ (S535).

Then, the server 85 may create an array building image corresponding to the constructed array building and transmit the created array building image to the display apparatus 95.

Thus, the display apparatus 95 may display the created array building image on the display 603.

Figure 6C:
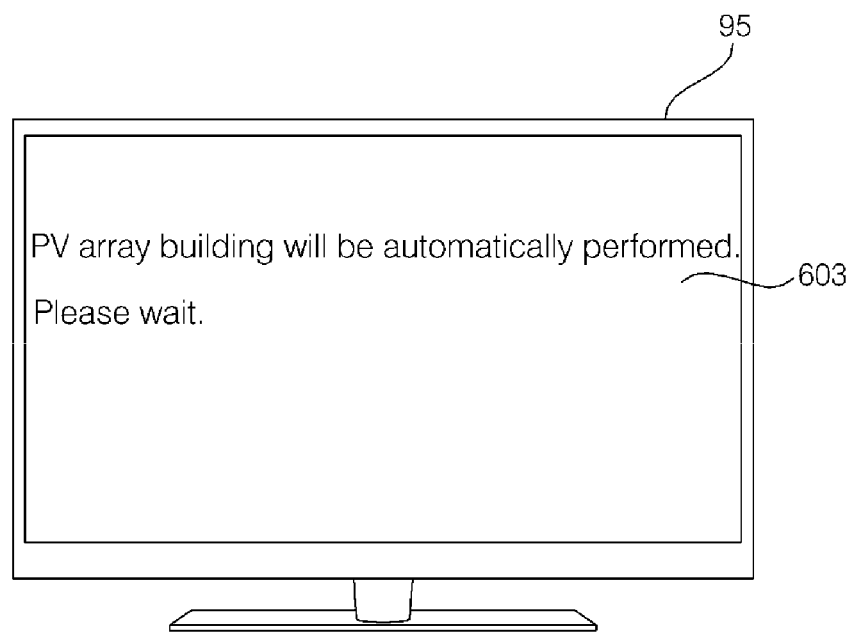

FIG. 6C illustrates that an object 603 indicating that array building is automatically performed is displayed on the display apparatus 95. Thereby, the user or the installer may recognize that array building is automatically performed in the server 85 or the like.

Figure 6D:
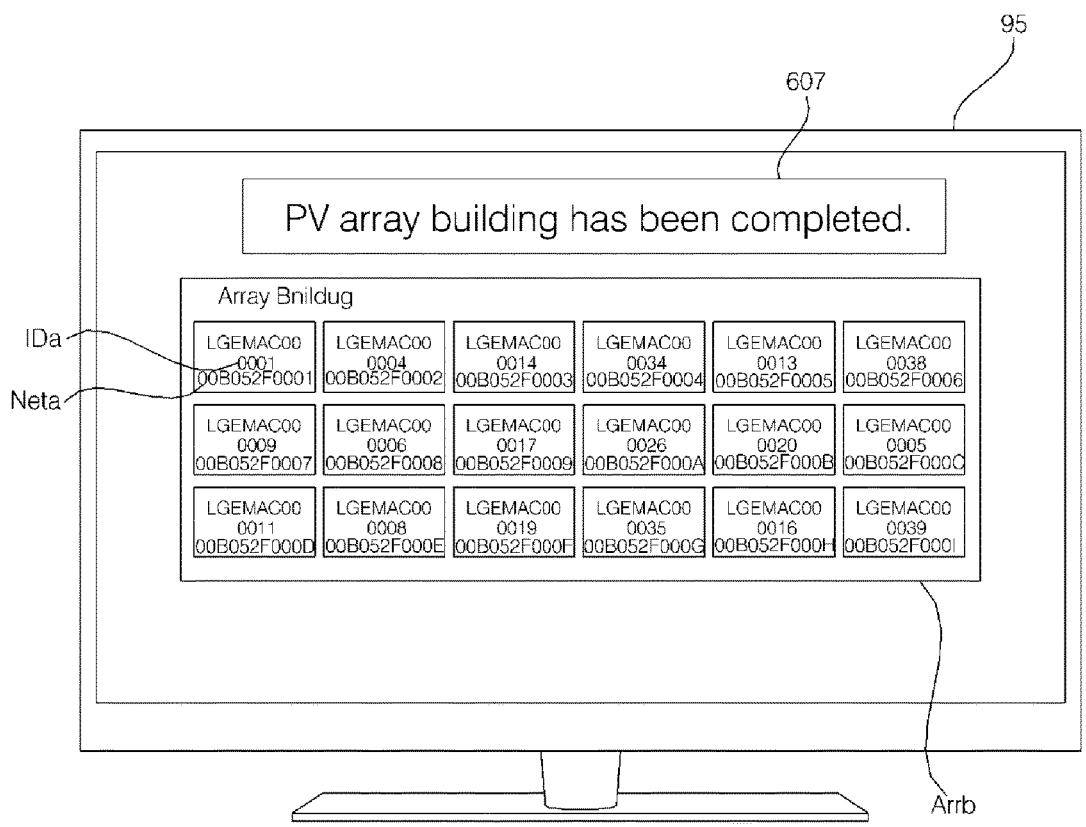

FIG. 6D illustrates displaying a created array building image Arrb on the display apparatus 95.

The display apparatus 95 may display the created array building image Arrb after displaying an object 607 indicating completion of array building, but the present invention is not limited thereto. It is also possible to display the object 607 indicting completion of array building and the created array building image Arrb together.

On the other hand, the created array building image Arrb may include a plurality of icons arranged in an array (for example, 3*n array) of the plurality of photovoltaic modules PV1-1 to PV3-$n$.

The plurality of icons may represent each of the photovoltaic modules.

Meanwhile, each of the icons may include ID information (IDa) and network information (Neta) on each photovoltaic module. Accordingly, the user or the installer may easily check the ID information and the network information on each photovoltaic module.

When each photovoltaic module performs solar power generation after completion of array building, the communication unit 580 of each photovoltaic module 50 may transmit power information to the gateway 80 through PLC (S540).

The power information may include at least one of information on voltage and current generated by solar cell modules 100, voltage information and current information on the inverter unit 540, and power generation amount information.

Meanwhile, the gateway 80 may receive the power information from each photovoltaic module 50 (S541) and transmit the same to the server 85.

The server 85 may calculate the power generation amount information on all of the photovoltaic modules using the power information from each photovoltaic module 50.

Then, the server 85 may transmit the power information or the power generation amount information to the display apparatus 95. Thus, the display apparatus 95 may display the power information or the power generation amount information (S542).

Figure 6E:
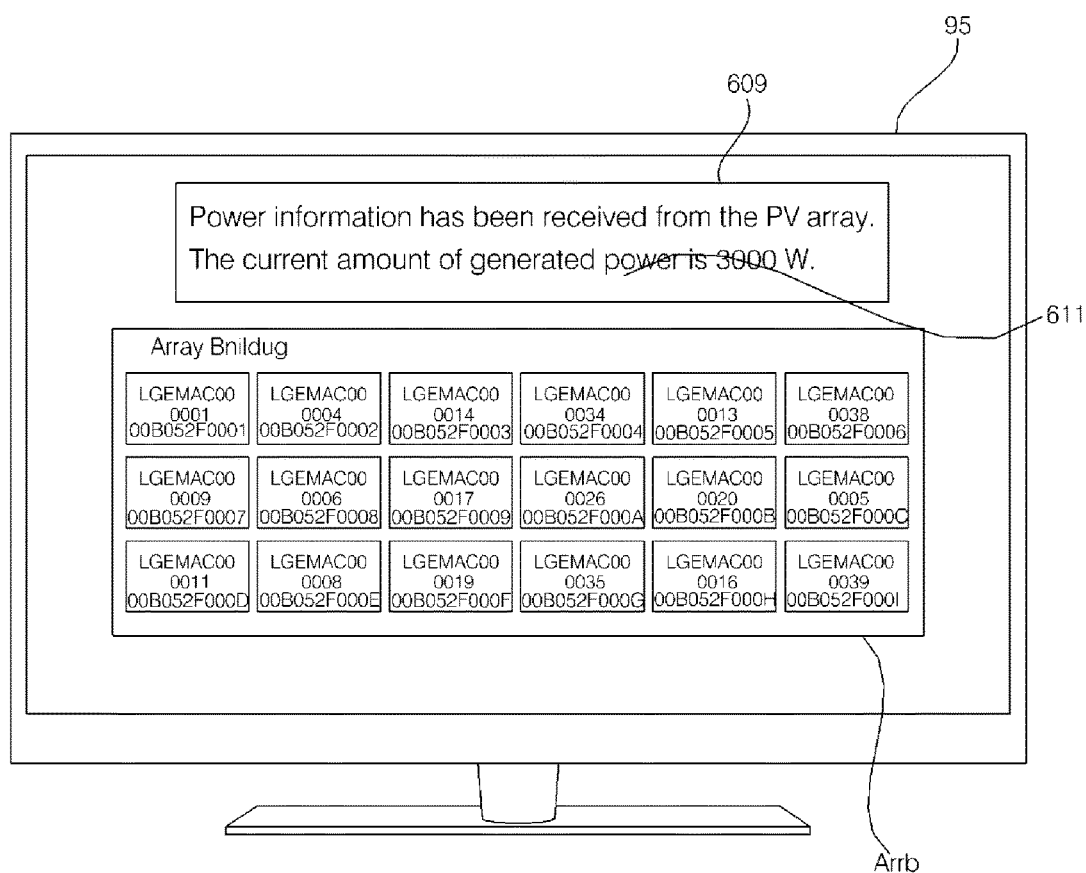

FIG. 6E illustrates displaying power generation amount information 611 on the display apparatus 95. In particular, FIG. 6E illustrates displaying the total power generation amount information from a plurality of photovoltaic modules.

As shown in FIG. 6E, the power generation amount information 611 may be displayed together with the created array building image Arrb. Thereby, the user or the installer may easily recognize the array building and the power generation amount information.

Figure 7:
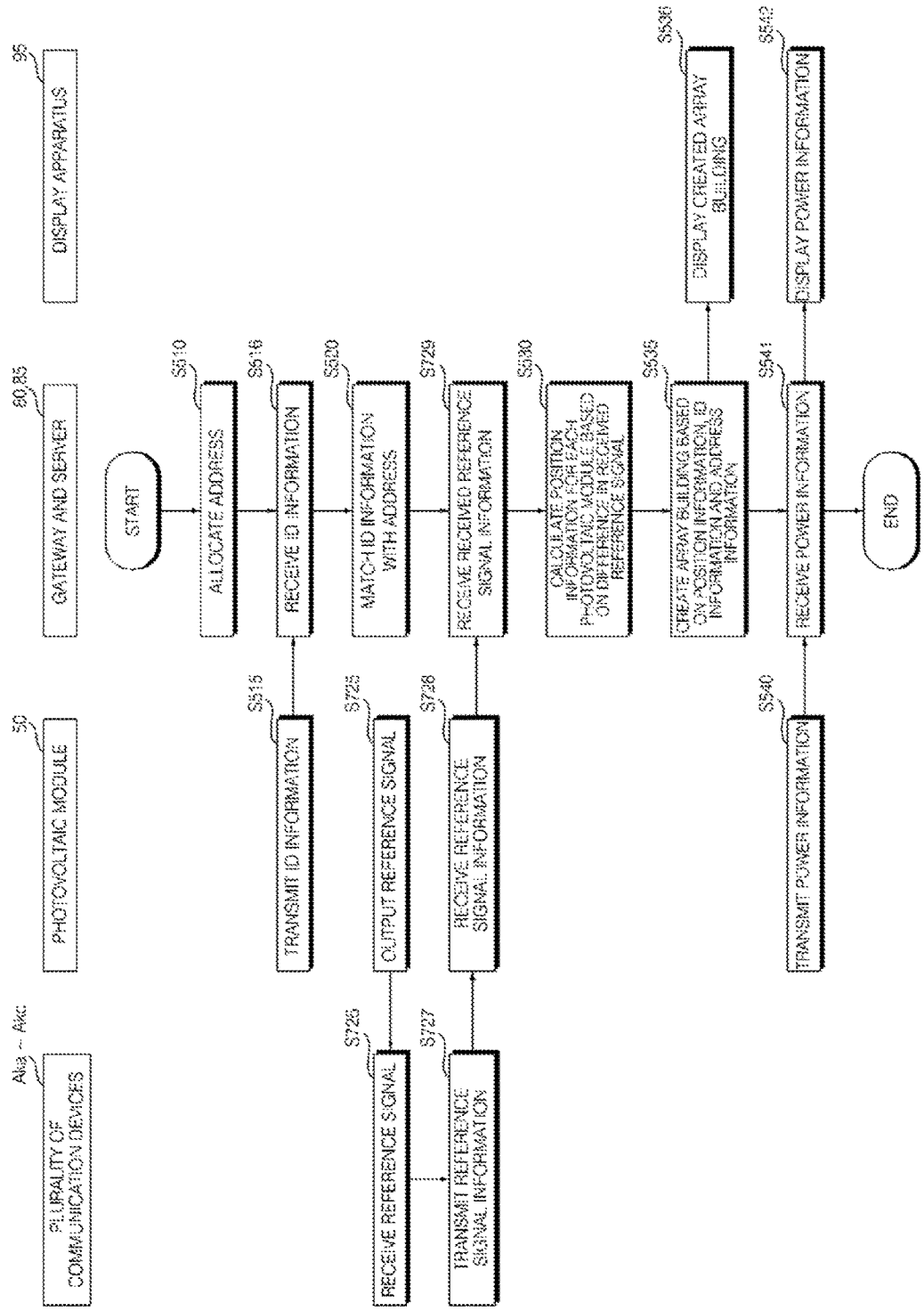
FIG. 7 is a flowchart illustrating an operation method of a photovoltaic system according to another embodiment of the present invention.
Figure 8:
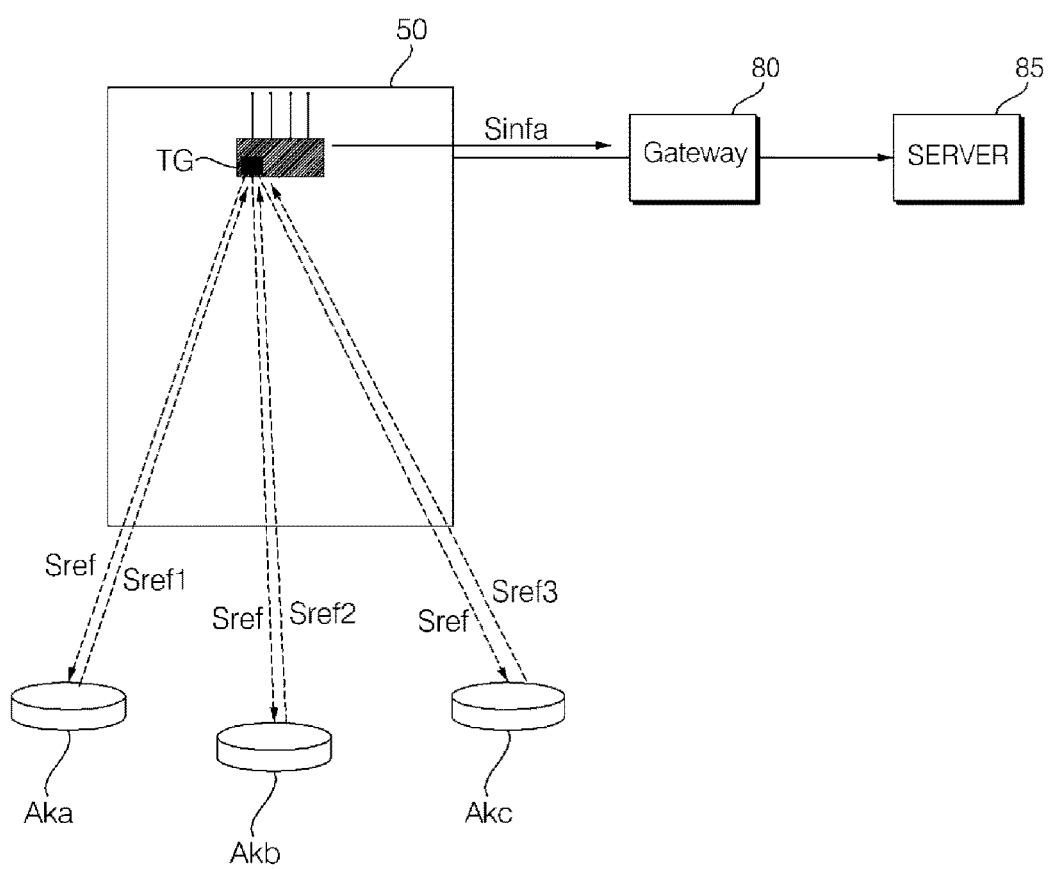
FIG. 8 is a reference diagram for explaining the operation method of FIG. 7.

FIG. 7 is a flowchart illustrating an operation method of a photovoltaic system according to another embodiment of the present invention, and FIG. 8 is a reference diagram for explaining the operation method of FIG. 7.

The flowchart of FIG. 7 is similar to the flowchart of FIG. 5, and has the same steps S510 to S520 and steps S530 to S542.

However, the flowchart of FIG. 7 is different from the flowchart of FIG. 5 in that, after outputting the reference signal from of the photovoltaic module (S725) and receiving the reference signal in the plurality of communication devices AKa to AKc (S726), the plurality of communication devices AKa to AKc transmits the reference signal information Sref1 to Sref3 to the photovoltaic module 50.

Accordingly, as shown in FIG. 8, the communication unit 580 in the photovoltaic module 50 may receive the reference signal information Sref1 to Sref3 (S728), and transmit the received reference signal information Sref1 to Sref3 to the gateway 80 or the server 85. In this operation, the information may be transmitted by wire through PLC.

Accordingly, the gateway 80 or the server 85 may receive the reference signal information Sref1 to Sref3 (S728).

Thereafter, steps S530 to S542 are performed, and a description thereof will be omitted with reference to FIG. 5 and subsequent drawings.

Figure 9:
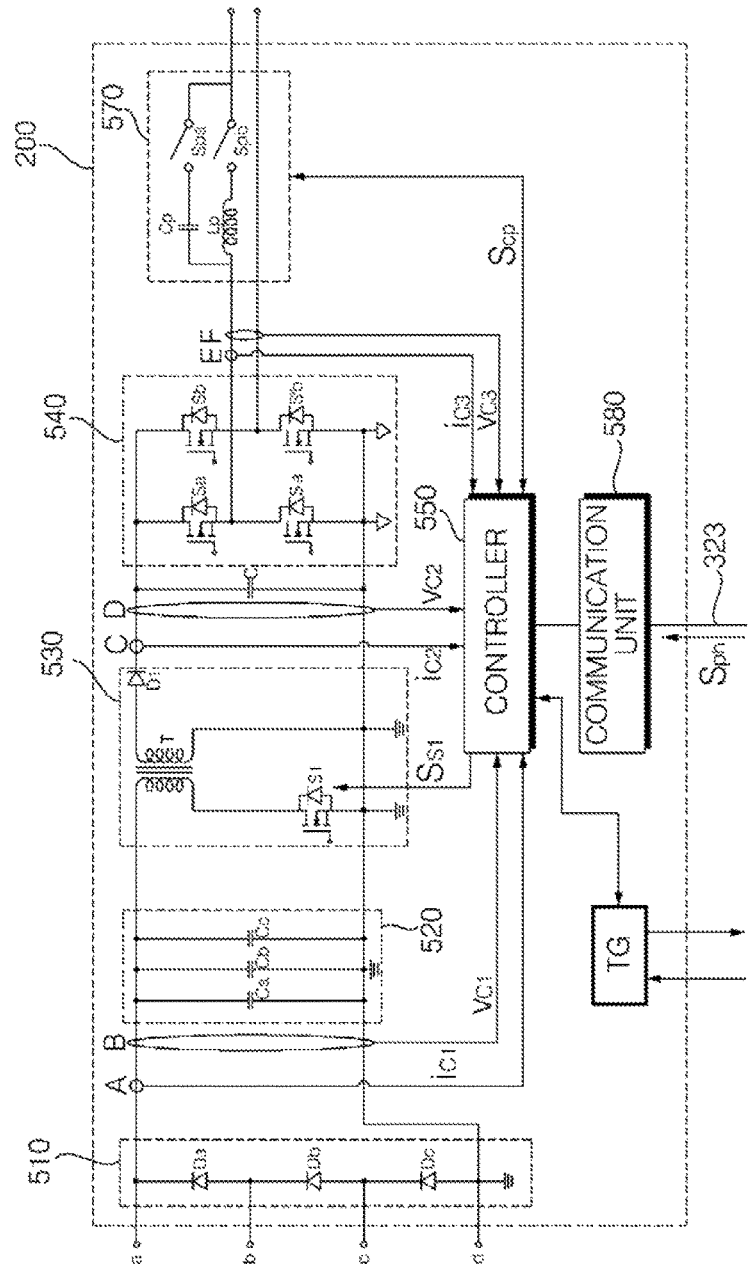
FIG. 9 is an internal circuit diagram of a junction box in the photovoltaic module of FIG. 3.

FIG. 9 is an internal circuit diagram of a junction box in the photovoltaic module of FIG. 3.

Referring to FIG. 9, the junction box 200 may convert the DC power from the solar cell module 100 and output the converted power.

Particularly, in the present invention, the junction box 200 may output AC power.

To this end, the junction box 200 may include a converter unit 530, an inverter unit 540, and a controller 550 for controlling the same.

The junction box 200 may further include a bypass diode unit 510 for the bypassing operation and a capacitor unit 520 for storing DC power.

The junction box 200 may further include a communication unit 580 for communicating with an external gateway 80 and a signal generator TG disclosed in the description of FIG. 3, 4A, or 4B.

The signal generator TG may wirelessly output a reference signal Sref containing ID information.

The junction box 200 may further include an input current sensing unit A, an input voltage sensing unit B, a converter output current detector C, a converter output voltage detector D, an inverter output current detector E, and an inverter output voltage detector F.

The controller 550 may control the converter unit 530, the inverter unit 540, the communication unit 580, and the signal generator TG.

For example, the controller 550 may control the signal generator TG to wirelessly output a reference signal Sref containing the ID information.

When the reference signal information Sref1 to Sref3 is received from a plurality of communication devices AKa to AKc through the signal generator TG or the like, the controller 550 may control the communication unit 580 to transmit the reference signal information Sref1 to Sref3 to the gateway 80 or the server 85.

When receiving a scan signal from the gateway 80, the controller 550 may control the communication unit 580 to transmit a response signal containing ID information and network information to the gateway 80.

The controller 550 may control the communication unit 580 to transmit power generation information (voltage information, current information, and power generation amount information) on the photovoltaic module 50 to the gateway 80.

The controller 550 may control the converter unit 530 to perform DC conversion. In particular, the controller 550 may perform maximum power point tracking (MPPT) control.

Meanwhile, the controller 550 may control the inverter unit 540 to perform AC conversion.

The bypass diode unit 510 may include bypass diodes Dc, Db, and Da disposed between first to fourth conductive lines 135a, 135b, 135c, and 135d of the solar cell module 100, respectively. Here, the number of the bypass diodes is greater than or equal to one. Preferably, the number of the bypass diodes is smaller than the number of the conductive lines by 1.

The bypass diodes Dc, Db and Da receive DC power from the solar cell module 100, particularly from the first to fourth conductive lines 135a, 135b, 135c, and 135d in the solar cell module 100. When a reverse voltage is generated from the DC power from at least one of the first to fourth conductive lines 135a, 135b, 135c, and 135d, the bypass diodes Dc, Db, and Da may bypass the reverse voltage.

The DC power passed through the bypass diode unit 510 may be input to the capacitor unit 520.

The capacitor unit 520 may store the input DC power input via the solar cell module 100 and the bypass diode unit 510.

While the capacitor unit 520 is illustrated in the figure as including a plurality of capacitors Ca, Cb, and Cc connected in parallel to each other, the plurality of capacitors may be connected in series-parallel combination, or connected to the ground terminal in series. Alternatively, the capacitor unit 520 may have only one capacitor.

The converter unit 530 may convert the level of the input voltage from the solar cell module 100 via the bypass diode unit 510 and the capacitor unit 520.

In particular, the converter unit 530 may perform power conversion using the DC power stored in the capacitor unit 520.

For example, the converter unit 530 may include a plurality of resistors or a transformer, and may perform voltage distribution with respect to an input voltage based on a set target power.

While a tapped inductor converter is illustrated as an example of the converter unit 530, a flyback converter, a buck converter, a boost converter, or the like may be employed as the converter unit 530.

The converter unit 530 shown in the figure, namely, the tapped inductor converter, may include a tapped inductor T, a switching element S1 connected between the tapped inductor T and the ground terminal, and a diode D1 connected to the output terminal of the tapped inductor to allow current to flow in one direction.

Meanwhile, a DC link capacitor may be connected between the output terminal of the diode D1, that is, the cathode of the diode D1 and the ground terminal.

Specifically, the switching element S1 may be connected between the tap of the tapped inductor T and the ground terminal. The output terminal (secondary side) of the tapped inductor T may be connected to the anode of the diode D1 and the DC link capacitor C1 is connected between the cathode of the diode D1 and the ground terminal.

The primary and secondary sides of the tapped inductor T have opposite polarities. On the other hand, the tapped inductor T may be referred to as a switching transformer.

The switching element S1 in the converter unit 530 may be turned on/off based on the converter switching control signal from the controller 550. Thereby, a level-converted DC power may be output.

The inverter unit 540 may convert the DC power converted by the converter unit 530 into AC power.

In the drawing, a full-bridge inverter is by example shown. Namely, an upper-arm switching element Sa, Sb is connected to a lower-arm switching element S'a, S'b in series to form one pair, and thus two pairs of upper-arm and lower-arm switching elements are connected in parallel (Sa&S'a, Sb&S'b). Each of the switching elements Sa, S'a, Sb, S'b is connected with a diode in reverse parallel.

The switching elements in the inverter 540 may be turned on/off based on an inverter switching control signal from the controller 550. Thereby, an AC voltage having a predetermined frequency may be output. Preferably, the predetermined frequency is the same as the AC frequency of the grid (about 60 Hz or 50 Hz).

Meanwhile, the capacitor C may be disposed between the converter unit 530 and the inverter unit 540.

The capacitor C may store the level-converted DC power of the converter unit 530. Both ends of the capacitor C may be referred to as DC links, and accordingly the capacitor C may be referred to as a DC-link capacitor.

The input current sensing unit A may sense the input current ic1 supplied from the solar cell module 100 to the capacitor unit 520.

The input voltage sensing unit B may sense an input voltage Vc1 supplied from the solar cell module 100 to the capacitor unit 520. Here, the input voltage Vc1 may be equal to the voltage stored in the capacitor unit 520.

The sensed input current ic1 and the sensed input voltage vc1 may be input to the controller 550.

The converter output current detector C detects an output current ic2 output from the converter unit 530, i.e., the DC link current, and the converter output voltage detector D detects an output voltage vc2, i.e., the DC link voltage output from the converter unit 530. The detected output current ic2 and the detected output voltage vc2 may be input to the controller 550.

The inverter output current detector E detects the current ic3 output from the inverter unit 540 and the inverter output voltage detector F detects the voltage vc3 output from the inverter unit 540. The detected current ic3 and voltage vc3 are input to the controller 550.

Meanwhile, the controller 550 may output a control signal for controlling the switching element S1 of the converter unit 530. In particular, the controller 550 may output a turn-on timing signal of the switching element S1 in the converter unit 530 based on at least one of the input current ic1, the input voltage vc1, the output current ic2, the output voltage vc2, the output current ic3 and the output voltage vc3.

The controller 550 may output an inverter control signal for controlling each of the switching elements Sa, S'a, Sb, S'b of the inverter unit 540. In particular, the controller 550 may output a turn-on timing signal for each of the switching elements Sa, S'a, Sb and S'b of the inverter unit 540 based on at least one of the detected input current ic1, the input voltage vc1, the output current ic2, the output voltage vc2, the output current ic3, and the output voltage vc3.

The controller 550 may calculate the maximum power point for the solar cell module 100 and correspondingly control the converter unit 530 to output DC power corresponding to the maximum power.

Meanwhile, the communication unit 580 may perform communication with the gateway 80.

For example, the communication unit 580 may exchange data with the gateway 80 by power line communication.

Meanwhile, the communication unit 580 may transmit the ID information, the current information, the voltage information, the power information, and the like on the photovoltaic module 50 to the gateway 80.

Figure 10A:
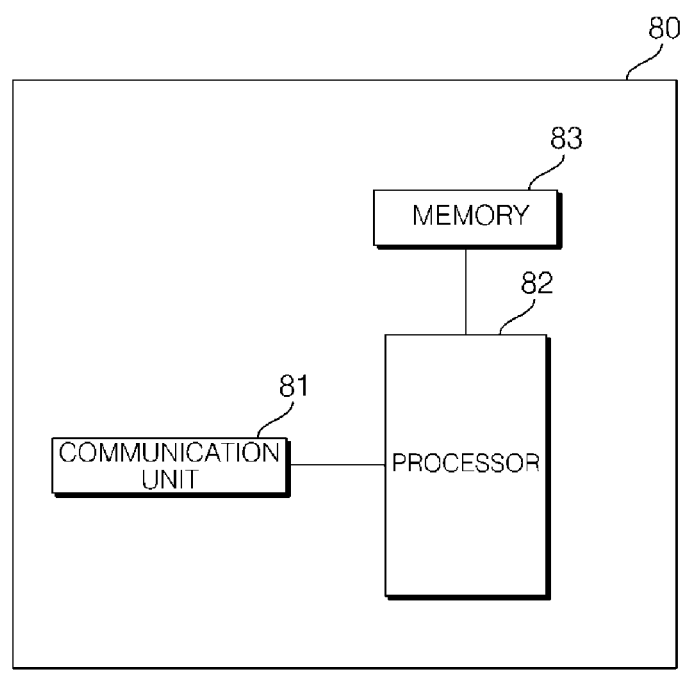
FIG. 10A is an example internal block diagram of the gateway of FIG. 3.

FIG. 10A is an example internal block diagram of the gateway of FIG. 3.

Referring to FIG. 10A, the gateway 80 may include a communication unit 81, a processor 82, and a memory 83.

When installation of the gateway 80 is completed by the installer, the processor 82 of the gateway 80 may allocate network information corresponding to the plurality of photovoltaic modules PV1-1 to PV3-*n*.

After allocating the network information, the processor 82 of the gateway 80 may perform a control operation to transmit a scan signal to the plurality of photovoltaic modules PV1-1 to PV3-*n* based on the allocated network information.

Thus, the communication unit 81 of the gateway 80 may transmit a scan signal to the plurality of photovoltaic modules PV1-1 to PV3-*n* through PLC or the like.

The communication unit 81 of the gateway 80 may receive response signals corresponding to the scan signal from the plurality of photovoltaic modules PV1-1 to PV3-*n*.

The processor 82 of the gateway 80 may match the network information (MAC address information) with the ID information based on the received response signals.

Meanwhile, the memory 83 may store the matched network information (MAC address information) and ID information.

The communication unit 81 of the gateway 80 may receive power information from the plurality of photovoltaic modules PV1-1 to PV3-*n*.

The communication unit 81 of the gateway 80 may transmit the response signals or power information from the plurality of photovoltaic modules PV1-1 to PV3-*n* to the server 85.

The communication unit 81 of the gateway 80 may transmit network information corresponding to the plurality of photovoltaic modules PV1-1 to PV3-*n* to the server 85.

Figure 10B:
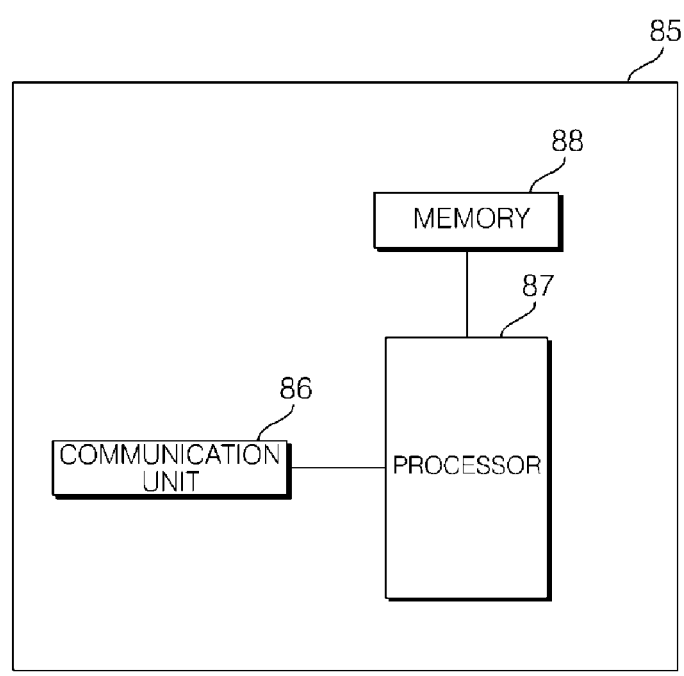
FIG. 10B is an example internal block diagram of the server of FIG. 3.

FIG. 10B is an example internal block diagram of the server of FIG. 3.

Referring to FIG. 3, the server 85 may include a communication unit 86, a processor 87, and a memory 88.

The processor 87 of the server 85 may calculate the position information on the plurality of photovoltaic modules PV1-1 to PV3-*n* based on the reference signal information Sref1 to Sref3 received via the communication unit 86.

Specifically, the processor 87 of the server 85 may calculate the position information on the plurality of photovoltaic modules PV1-1 to PV3-*n* based on the signal level difference or phase difference of the reference signal information Sref1 to Sref3 for each of the communication devices AKa to AKc, using triangulation.

The processor 87 of the server 85 may perform a control operation to store the network information (MAC address information) and the ID information received via the communication unit 86 in the memory 88.

Alternatively, the processor 87 of the server 85 may match the network information (MAC address information) with the ID information based on the response signals received via the communication unit 86. Then, the processor 87 may perform a control operation to store the network information (MAC address information) and the ID information in the memory 88.

The processor 87 of the server 85 may configure array building of the photovoltaic modules based on the position information, network information (MAC address information) and ID information on the plurality of photovoltaic modules PV1-1 to PV3-n, and create an array building image corresponding to the array building.

The processor 87 of the server 85 may perform a control operation to transmit the array building image to the display apparatus 95 via the communication unit 86.

The processor 87 of the server 85 may receive power generation information on the plurality of photovoltaic modules PV1-1 to PV3-n received via the communication unit 86, and calculate the total power generation amount information on the entire photovoltaic modules PV1-1 to PV3-n based on the received power generation information.

Then, the processor 87 of the server 85 may perform a control operation to transmit the power generation amount information to the display apparatus 95 through the communication unit 86.

Figure 10C:
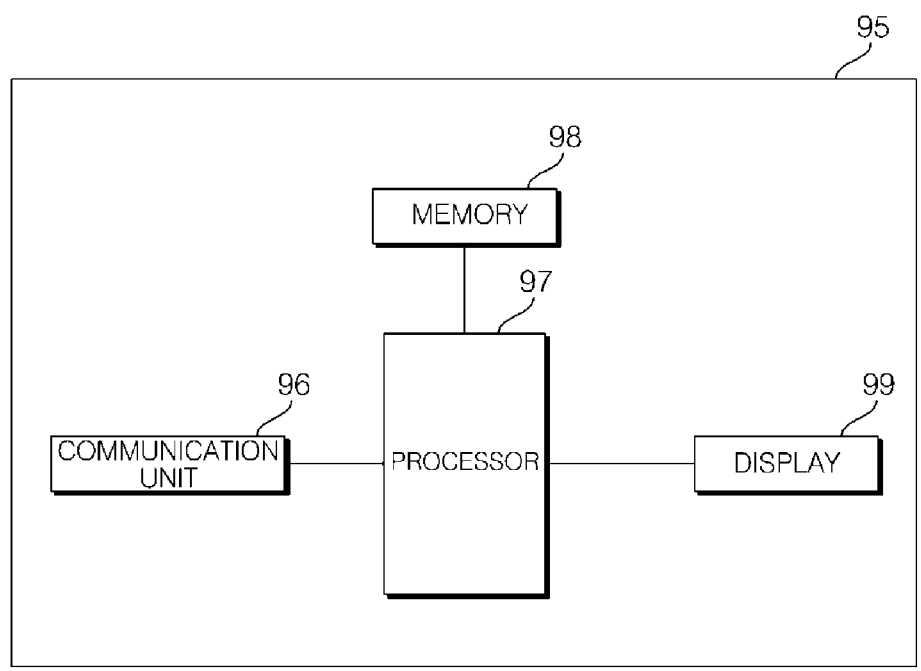
FIG. 10C is an example internal block diagram of the display apparatus of FIG. 3.

FIG. 10C is an example internal block diagram of the display apparatus of FIG. 3.

Referring to FIG. 10C, the display apparatus 95 may include a communication unit 96, a processor 97, a memory 98, and a display 99.

The processor 97 of the display apparatus 95 may control an array building image received via the communication unit 96 to be displayed on a display 99.

Meanwhile, the processor 97 of the display apparatus 95 may perform a control operation to display an object 603 indicating that array building is automatically performed.

The processor 97 of the display apparatus 95 may perform a control operation to display an object 607 indicating completion of array building.

The processor 97 of the display apparatus 95 may also control the power generation amount information received via the communication unit 96 to be displayed on the display 99.

The memory 98 may store the array building image or power generation amount information.

Figure 12:
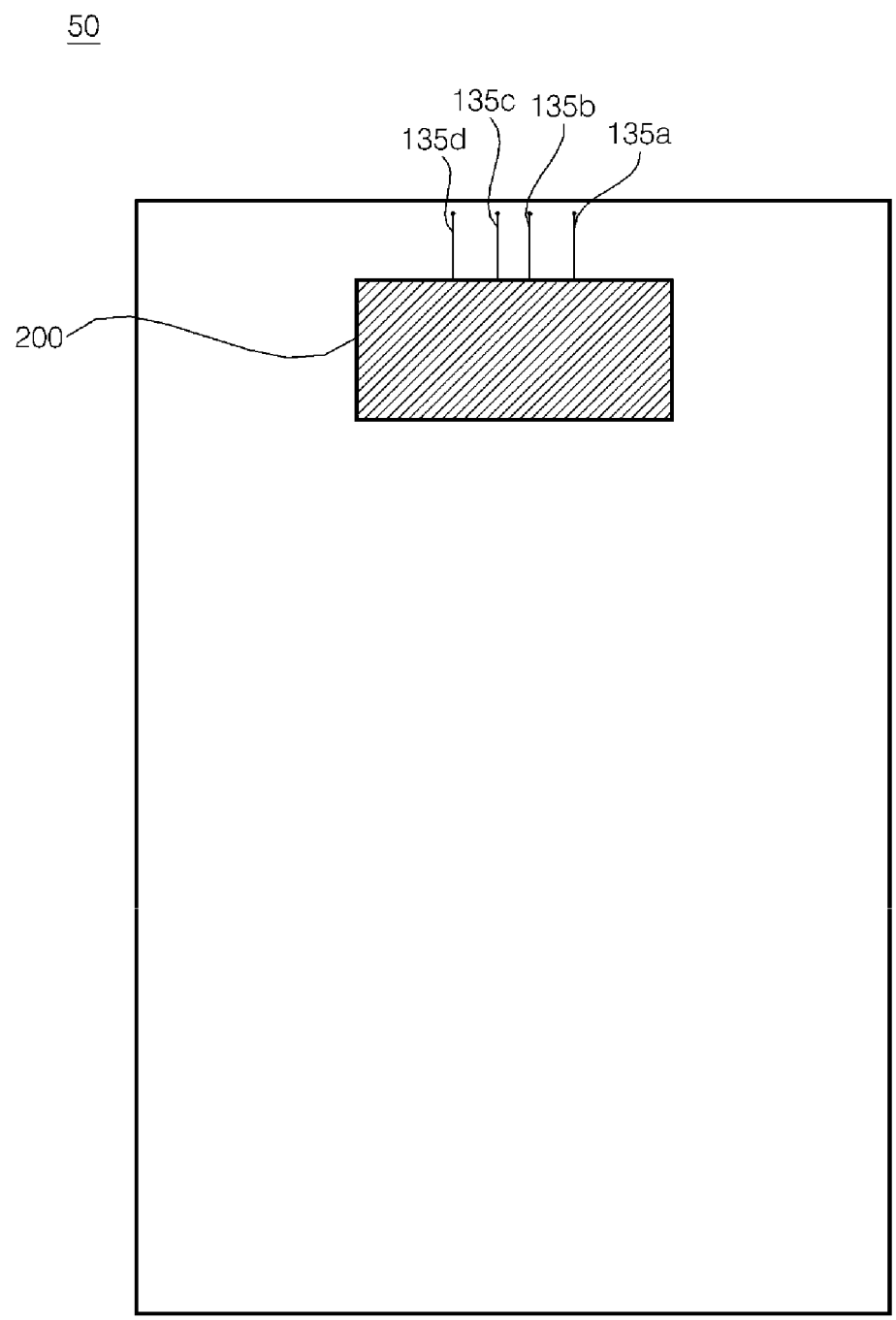
FIG. 12 is a rear view showing the photovoltaic module of FIG. 11.

FIG. 11 is a front view showing the photovoltaic module of FIG. 3, and FIG. 12 is a rear view showing the photovoltaic module of FIG. 11.

Referring to FIGS. 11 and 12, a photovoltaic module 50 according to an embodiment may include a solar cell module 100 and a junction box 200 positioned on the back surface of the solar cell module 100.

The junction box 200 may include at least one bypass diode that is bypassed in order to prevent hot spots in case of shadow occurrence or the like.

In FIG. 9 and the like, three bypass diodes (Da, Db, and Dc in FIG. 9) are provided according to the four solar cell strings of FIG. 11.

Meanwhile, the junction box 200 may convert the DC power supplied from the solar cell module 100. For details, see FIG. 9 and subsequent figures.

The solar cell module 100 may include a plurality of solar cells.

The figures illustrate that a plurality of solar cells is connected in series by ribbons 133 (see FIG. 13) to form a solar cell string 140. Thereby, six strings 140a, 140b, 140c, 140d, 140e and 140f are formed, each of which includes ten solar cells. Various modifications may be made to the illustrated example.

The respective solar cell strings may be electrically connected by bus ribbons. FIG. 11 illustrates that the first solar cell string 140a is electrically connected with the second solar cell string 140b, the third solar cell string 140c is electrically connected with the fourth solar cell string 140d, and the fifth solar cell string 140e is electrically connected with the sixth solar cell string 140f, by the bus ribbons 145a, 145c and 145e disposed at the lower portion of the solar cell module 100, respectively.

FIG. 11 also illustrates that the second solar cell string 140b is electrically connected with the third solar cell string 140c, and the third solar cell string 140d is electrically connected with the fifth solar cell string 140e, by the bus ribbons 145b and 145d disposed at the upper portion of the solar cell module 100, respectively.

The ribbon connected to the first string, the bus ribbons 145b and 145d, and the ribbon connected to the fourth string may be electrically connected to the first to fourth conductive lines 135a, 135b, 135c, and 135d, respectively. The first to fourth conductive lines 135a, 135b, 135c, and 135d may be electrically connected to the bypass diodes Da, Db, and Dc (see FIG. 6) in the junction box 200 disposed on the back surface of the solar cell module 100, through openings formed in the solar cell module 100. In the figure, the first to fourth conductive lines 135a, 135b, 135c, and 135d are illustrated as extending to the back surface of the solar cell module 100 through the openings formed in the solar cell module 100.

The junction box 200 is preferably disposed closer to an end of the solar cell module 100 to which the conductive lines extend between both ends of the solar cell module 100.

Figure 13:
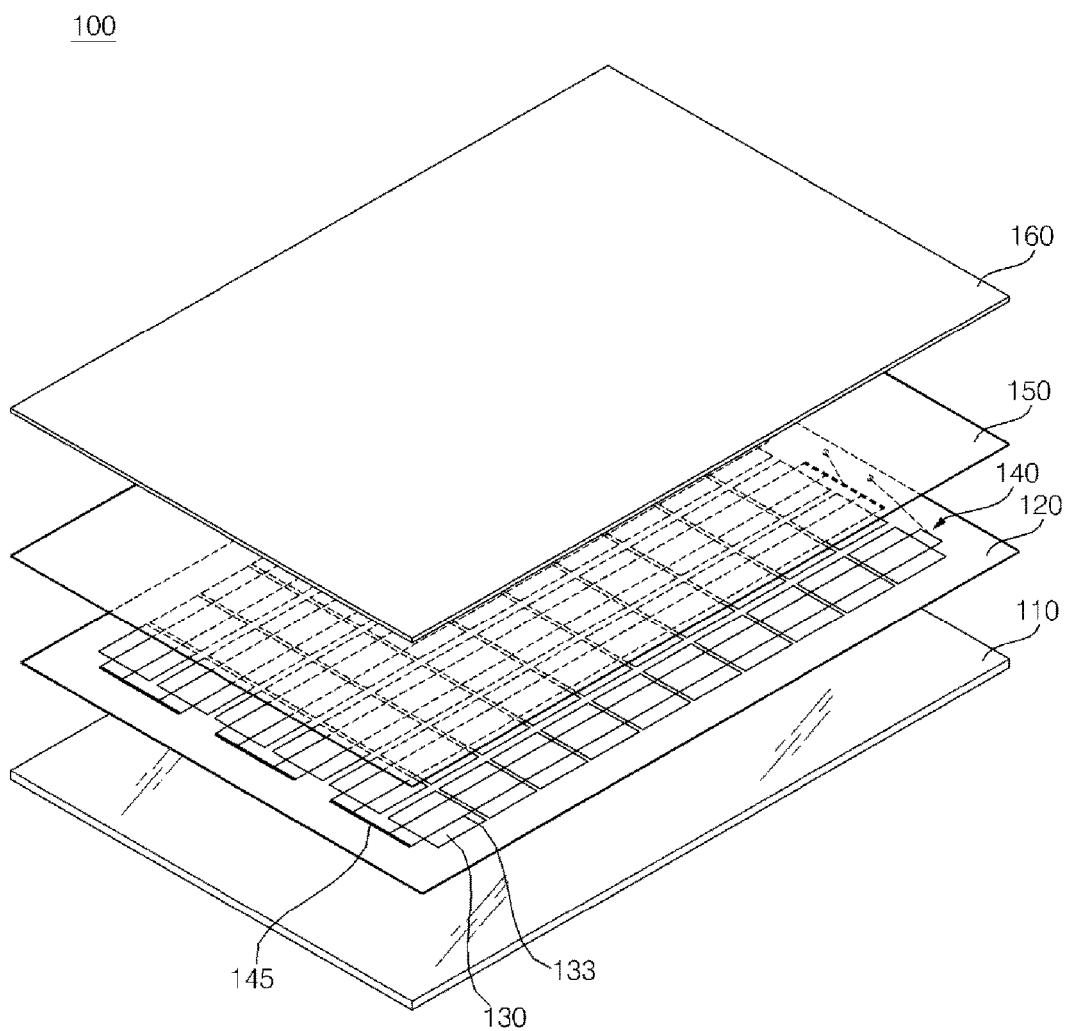
FIG. 13 is an exploded perspective view showing the solar cell module of FIG. 11.

FIG. 13 is an exploded perspective view showing the solar cell module of FIG. 11.

Referring to FIG. 13, the solar cell module 100 of FIG. 11 may include a plurality of solar cells 130. The solar cell module 100 may further include a first sealing member 120 and a second sealing member 150 located on the lower surface and upper surface of the plurality of solar cells 130, a rear substrate 110 located on the lower surface of the first sealing member 120, and a front substrate 160 located on the upper surface of the second sealing member 120.

The solar cell 130 may be a semiconductor device that converts sunlight into electrical energy. The solar cell 130 may be a silicon solar cell, a compound semiconductor solar cell, a tandem solar cell, a dye-sensitized CdTe or CIGS type solar cell, a thin film solar cell, or the like.

The solar cell 130 includes a light receiving surface onto which sunlight is incident and a surface opposite to the light receiving surface. For example, the solar cell 130 may include a silicon substrate of a first conductive type, a second conductive type semiconductor layer formed on the silicon substrate and having a conductive type opposite to the first conductive type, an antireflection film formed on the second conductive type semiconductor layer and having at least one opening exposing a part of the surface of the second conductive type semiconductor layer, a front electrode contacting the part of the surface of the second conductive type semiconductor layer exposed through the at least one opening, and a rear electrode formed on the rear surface of the silicon substrate.

The respective solar cells 130 may be electrically connected in series, parallel, or series-parallel. Specifically, the plurality of solar cells 130 may be electrically connected by a ribbon 133. The ribbon 133 may be bonded to the front electrode formed on the light receiving surface of a solar cell 130 and the rear electrode formed on the opposite surface of an adjacent solar cell 130.

In FIG. 13, it is illustrated that the ribbon 133 is formed in two rows, and the solar cells 130 are connected in a row by the ribbon 133 to form the solar cell string 140.

Thus, six strings 140a, 140b, 140c, 140d, 140e and 140f may be formed as described with reference to FIG. 11, and each string may include ten solar cells.

The rear substrate 110 may have waterproof, insulating and ultraviolet shielding functions as a back sheet, and may have a TPT (Tedlar/PET/Tedlar) structure. However, embodiments of the present invention are not limited thereto. While the rear substrate 110 is illustrated in FIG. 9 as having a rectangular shape, the rear substrate 110 may be fabricated in various shapes such as a circular shape and a semicircular shape depending on the environment in which the solar cell module 100 is installed.

The first sealing member 120 may have the same size as that of the rear substrate 110 and be attached to the rear substrate 110, and the plurality of solar cells 130 may be positioned adjacent to each other on the first sealing member 120 such that the solar cells 130 are arranged in several rows.

The second sealing member 150 may be positioned on the solar cells 130 and be bonded to the first sealing member 120 by lamination.

Here, the first sealing member 120 and the second sealing member 150 allow the elements of the solar cell to be chemically bonded. Examples of the first sealing member 120 and the second sealing member 150 may include an ethylene vinyl acetate (EVA) film.

The front substrate 160 is preferably positioned on the second sealing member 150 so as to transmit sunlight, and is preferably made of tempered glass in order to protect the solar cells 130 from external shock or the like. More preferably, the front substrate 160 is made of tempered low-iron glass having a low iron content in order to prevent reflection of sunlight and increase transmittance of sunlight.

The solar cell module and the photovoltaic system including the same according to the present invention are not limited to the configurations and methods of the embodiments described above. Variations may be made to the embodiments described above by selectively combining all or some of the embodiments.

As is apparent from the above description, according to embodiments of the present invention, a photovoltaic system includes a plurality of photovoltaic modules outputting AC power, a plurality of communication devices to receive respective reference signals from the plurality of photovoltaic modules and to output reference signal information corresponding to the reference signals, a gateway to receive the reference signal information and to allocate network information to each of the plurality of photovoltaic modules and to match ID information received from the plurality of photovoltaic modules with the network information, and a server to calculate position information on the plurality of photovoltaic modules based on the reference signal information from the gateway and to perform array building corresponding to arrangement of the plurality of photovoltaic modules based on the position information, the ID information, and the network information. Thereby, the position information on the photovoltaic module may be easily calculated and further array building corresponding to arrangement of the plurality of photovoltaic modules may be easily performed based on the calculated position information.

Particularly, by automatically performing array building corresponding to arrangement of a plurality of photovoltaic modules, user convenience may be increased.

By displaying an array building image corresponding to the array building through the display apparatus, the user may easily check the array building.

As the server computes the power information output from the entirety of the plurality of photovoltaic modules based on the power information on each of the photovoltaic modules, the array building image and the power information may be displayed together through the display apparatus. Accordingly, user convenience may be increased.

According to embodiments of the present invention, a photovoltaic module may include a solar cell module having a plurality of solar cells, an inverter unit to output AC power converted based on DC power from the solar cell module, a communication unit to transmit the ID information, and a signal generator to generate and wirelessly output a reference signal including the ID information. Thereby, the position information on the photovoltaic module may be easily calculated and further array building corresponding to arrangement of the plurality of photovoltaic modules may be easily performed based on the calculated position information.

The photovoltaic module calculates power based on the output voltage and output current of the inverter unit, and transmits the calculated power information to the gateway through the communication unit. Thereby, the power information may be displayed on the display apparatus.

The photovoltaic module may transmit ID information to the gateway based on a scan signal from the gateway, and accordingly the server or the like may easily perform array building.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A photovoltaic system comprising:
a plurality of photovoltaic modules to output alternating current (AC) power;
a plurality of communication devices to wirelessly receive respective reference signals from the plurality of photovoltaic modules and to output reference signal information corresponding to the reference signals;
a gateway to receive the reference signal information, to allocate network information to each of the plurality of photovoltaic modules and to match identification (ID) information received from the plurality of photovoltaic modules with the network information; and
a server to calculate position information on the plurality of photovoltaic modules based on the reference signal information from the gateway and to perform array building corresponding to an arrangement of the plurality of photovoltaic modules based on the position information, the ID information, and the network information,
wherein, based on a power line communication, the gateway transmits a scan signal to the plurality of photovoltaic modules, and, in response to the scan signal, the gateway receives a plurality of response signals from the plurality of photovoltaic modules, wherein each response signal includes the ID information and the network information of each photovoltaic module, and wherein the server receives a plurality of the reference signal information from the plurality of communication devices via the gateway, and calculates the position information on the plurality of photovoltaic modules based on signal level difference or phase difference of the plurality of the reference signal information.

2. The photovoltaic system according to claim 1, further comprising:

a display apparatus to display an array building image corresponding to the performed array building.

3. The photovoltaic system according to claim 1, wherein each of the photovoltaic modules comprises:

a solar cell module having a plurality of solar cells;

an inverter to convert direct current (DC) power from the solar cell module to alternating current (AC) power, and to output the AC power;

a communication unit to transmit the ID information to the gateway; and a signal generator to generate and output one reference signal containing the ID information.

4. The photovoltaic system according to claim 3, wherein each of the photovoltaic modules further comprises:

a controller to calculate power based on an output voltage and an output current of the inverter and to control information on the calculated power to be transmitted to the gateway through the communication unit.

5. The photovoltaic system according to claim 3, wherein the communication unit transmits the ID information to the gateway based on the scan signal from the gateway.

6. The photovoltaic system according to claim 1, wherein the gateway further receives the ID information on each of the photovoltaic modules and the network information in response to the scan signal.

7. The photovoltaic system according to claim 1, wherein the gateway transmits the reference signal information, the ID information, and the network information to the server.

8. The photovoltaic system according to claim 2, wherein the array building image comprises an icon representing each of the plurality of photovoltaic modules, and wherein the icon comprises ID information on a corresponding one of the plurality of photovoltaic modules and the network information.

9. The photovoltaic system according to claim 2, wherein the display apparatus displays the array building image and the power information being output from all of the plurality of photovoltaic modules together.

10. The photovoltaic system according to claim 9, wherein the server calculates power information being output from all of the plurality of photovoltaic modules based on power information on each of the plurality of photovoltaic modules.

11. The photovoltaic system according to claim 1, wherein the plurality of communication devices receive the reference signals output from respective signal generators of the plurality of photovoltaic modules, and outputs reference signal information corresponding to the reference signals.

12. The photovoltaic system according to claim 1, wherein the plurality of communication devices receive the reference signals from the plurality of photovoltaic modules and extracts the ID information and the network information from the received reference signals.

13. The photovoltaic system according to claim 12, wherein the plurality of communication devices output the reference signal information corresponding to the reference signals to the gateway or the server based on the extracted ID information and network information.

* * * * *